US010397815B2

(12) United States Patent
Myron et al.

(10) Patent No.: US 10,397,815 B2
(45) Date of Patent: Aug. 27, 2019

(54) CELLULAR BASE STATION MONITORING

(71) Applicant: T-Mobile USA, Inc., Bellevue, WA (US)

(72) Inventors: Peter P. Myron, Renton, WA (US); Samson Kim-Sun Kwong, Bellevue, WA (US); Michael J. Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/877,718

(22) Filed: Jan. 23, 2018

(65) Prior Publication Data

US 2019/0230531 A1      Jul. 25, 2019

(51) Int. Cl.
*H04W 24/08* (2009.01)
*H04W 24/04* (2009.01)
*H04W 88/08* (2009.01)

(52) U.S. Cl.
CPC ........... *H04W 24/08* (2013.01); *H04W 24/04* (2013.01); *H04W 88/08* (2013.01)

(58) Field of Classification Search
CPC ..... H04W 24/08; H04W 88/08; H04W 24/04; H04W 36/08; H04W 24/02; H04W 76/19
See application file for complete search history.

(56) References Cited

U.S. PATENT DOCUMENTS

| 6,885,640 | B2 | 4/2005 | Pinola | |
|---|---|---|---|---|
| 8,229,428 | B2 * | 7/2012 | Marsan | H04W 48/20 370/329 |
| 2002/0098859 | A1 | 7/2002 | Murata | |
| 2012/0058777 | A1 * | 3/2012 | Nguyen | H04W 24/02 455/456.1 |
| 2014/0120921 | A1 * | 5/2014 | Keskitalo | H04W 36/0061 455/438 |
| 2015/0031307 | A1 * | 1/2015 | Gao | H04W 24/10 455/67.11 |
| 2015/0201341 | A1 | 7/2015 | Nunokawa et al. | |
| 2017/0156169 | A1 | 6/2017 | Lakshmi Narayanan et al. | |
| 2017/0188250 | A1 * | 6/2017 | Stevens | H04W 24/08 |

FOREIGN PATENT DOCUMENTS

WO    WO-2013034092 A1 *   3/2013   ............ H04W 24/04

OTHER PUBLICATIONS

Office Action for U.S. Appl. 15/878,133, dated Oct. 2, 2018, Myron et al, "Local Monitoring of Cellular Base Stations", 16 pages.

* cited by examiner

*Primary Examiner* — Nam T Huynh
(74) *Attorney, Agent, or Firm* — Lee & Hayes, P.C.

(57) ABSTRACT

Monitoring devices, which in some cases may comprise smartphones, are placed at base stations of a cellular communications network to report base station information. This may be performed in some cases without relying on communications with the base station, such as by monitoring sensors of the monitoring device and by analyzing signals transmitted by the monitored base stations. Status information regarding a monitored base station and/or anomalies detected at the base station are communicated to a central support service using the wireless capabilities of the monitored base station itself. In cases where the monitored base station is inoperative, the monitoring device can communicate through a neighboring base station.

20 Claims, 4 Drawing Sheets

CELLULAR BASE STATION MONITORING

BACKGROUND

A cellular communications provider may have thousands of geographically distributed cell sites and corresponding base stations. Maintenance of the base stations can be expensive, and the costs of sending maintenance crews to malfunctioning base stations can be a significant component of overall maintenance costs. However, it can at times be difficult for a provider to accurately assess the status of a base station. In addition, it may be difficult to determine the nature or cause of a malfunction.

In some situations, it may be possible to query the base station itself to obtain performance parameters, and to analyze the performance parameters to detect performance degradation. However, performance indicators received from the base station may not be accurate or reliable in that they are generated by the base station, which itself might be malfunctioning.

The difficulty in remotely assessing base station status may result in undetected outages, which may negatively affect user experiences. In addition, difficulty in determining base station status may result in needlessly dispatching a service crew to a site or in sending the wrong type of service crew.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
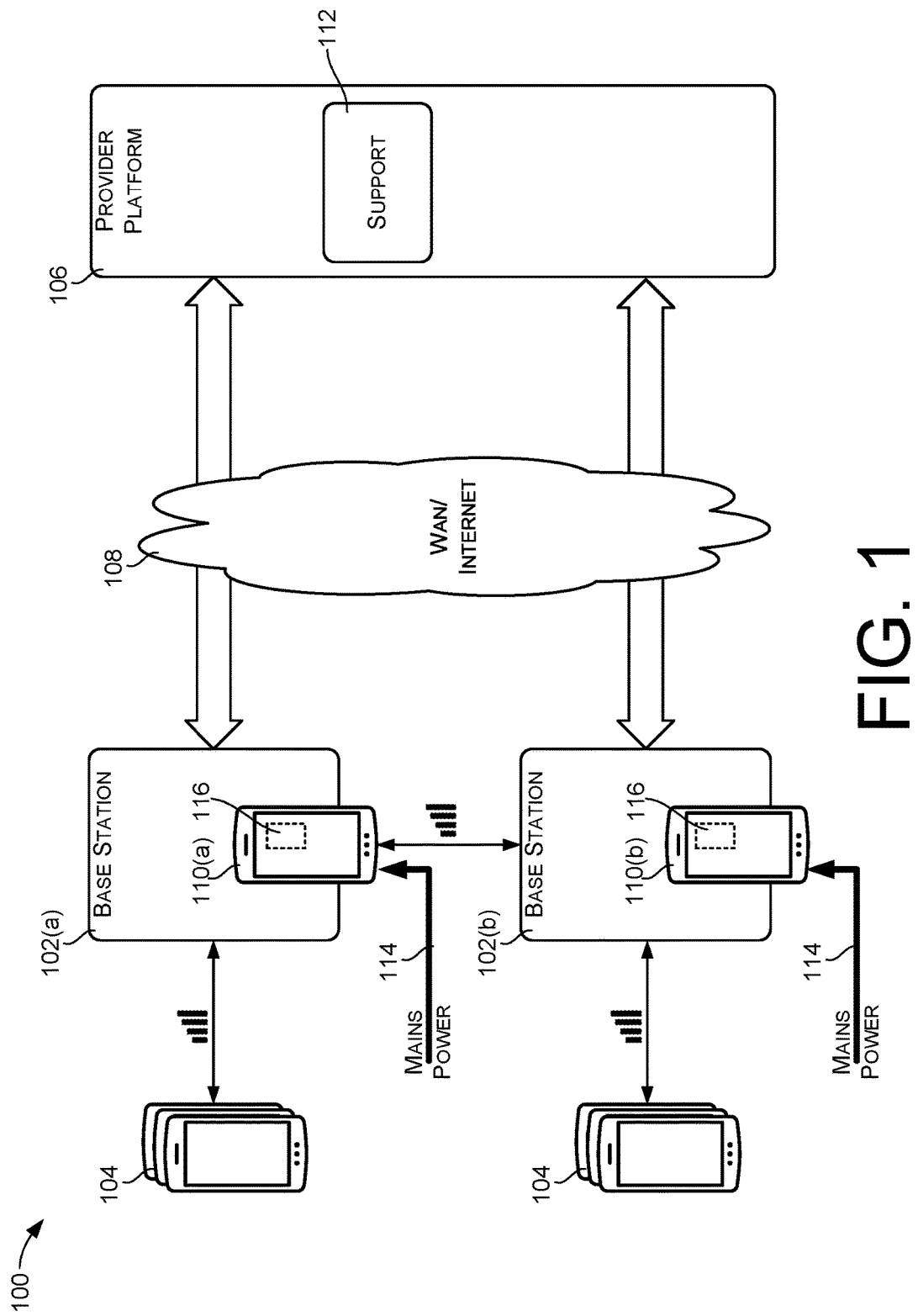
FIG. 1 is a block diagram of an example configuration that enables the detection of operating anomalies at multiple base stations of a cellular communication network.

The described implementations provide devices, systems, and methods to determine base station status at the cell sites of a cellular communications network, to detect and report environmental conditions at the cell sites, and to detect and report problems and potential problems resulting from various conditions and/or events at the cell sites.

In a described embodiment, monitoring devices are placed at the base stations of multiple cell sites of the cellular communications network. For example, a monitoring device may be placed within a base station enclosure or in an independent enclosure at or near the base station. The monitoring devices may have connections to mains power, but may also have battery backup so that they can receive power even during outages of the mains power.

The monitoring devices may have cellular communication capabilities, enabling them to report local conditions and events to a support service of the cellular communications network using the wireless communication capabilities of the provider's network or of another provider's network.

In certain embodiments, each monitoring device comprises a programmable telecommunications handset, such as a smartphone, that has been manufactured and distributed for use by consumers. A mobile device such as this inherently has battery backup, and can detect when it is no longer receiving mains power. A device like this also has cellular wireless capabilities as well as various sensors that may be used to detect conditions and events that may either cause a base station fault or that may be symptomatic of a base station fault. Furthermore, devices such as this may be readily available to cellular service providers at reasonable prices.

Generally, the handset is configured to obtain data, referred to herein as site data, regarding the environment and operation of an associated base station, and to report the site data to a central support service that is associated with the cellular communications network. The support service may in some cases be an automated service that notifies appropriate service personnel in response to identified base station anomalies.

The handset may have various components and sensors that can be used for obtaining site data. For example, the handset may have sensors such as temperature sensors, moisture/water sensors, movement sensors, infrared sensors, air quality sensors, and so forth, all of which may be relevant to the operation of the base station. In addition, cellular communication capabilities of the handset can be used to detect and/or analyze signal transmissions of the monitored base station.

The handset is configured to generate site data based on the components and sensors mentioned above. For example, site data may include data regarding environmental conditions at the monitored base station, such as temperature, whether moisture or water has been detected, whether there has been a seismic event, air quality, etc. Site data may also indicate whether a power outage has been detected, whether the monitored base station has ceased to transmit data signals, and/or the ability or inability of the handset to attach to the monitored base station. Site data may also indicate signal characteristics of data signals transmitted by the monitored base station, such as data rates, communication latencies, signal strength, data throughput, etc.

In some cases, the site data may comprise an indication of an anomaly that has been detected based on sensor data or other data. For example, instead of the site data indicating the temperature at the base station, the site data may indicate that the temperature has exceeded a designated limit or threshold. Similarly, the site data may indicate simply that there has been a power outage at the monitored base station. The handset may be configured to detect anomalies such as faults and malfunctions, conditions or events that might cause faults or malfunctions, and/or conditions or events that might be symptomatic of faults or malfunctions. Further specific examples of anomalies include the cessation of radio transmissions by the monitored base station, lower than usual observed data throughput from the monitored base station, a seismic event at a monitored base station, an inability of the handset to attach to the monitored base station, etc.

During normal operation, the handset may communicate with the central support service using wireless, cellular-based communications, through the monitored base station itself. When the handset detects an anomaly at the monitored base station, however, communications through the monitored base station may not be possible because the monitored base station may be inoperative. In these situations, the handset connects to a neighboring base station and reports any detected anomaly to the central support service by communicating wirelessly through the neighboring base station.

In some embodiments, the handset may periodically obtain and report site data to the central support service regardless of whether an anomaly has been detected or whether the site data is anomalous. In other cases, the handset may analyze the gathered data to detect anomalies, and may communicate with the central support service only to report anomalies and related site data.

The placement such as this of relatively inexpensive handsets, such as commercial-type smartphones, allows monitoring of many base stations at a relatively low cost and may provide diagnostic information that has not previously been available to service providers.

FIG. 1 illustrates an example of a wireless, cellular communications network 100 such as may be implemented by a wireless service provider. The cellular communications network 100 comprises multiple base stations 102. The base stations 102 communicate wirelessly with multiple user devices 104, and connect the user devices 104 with a provider platform 106 so that the devices 104 can communicate with each other and with user devices of other provider networks. For purposes of discussion, FIG. 1 shows two base stations 102, referred to herein as a first base station 102(a) and a second base station 102(b). The first base station 102(a) may also be referred to herein as a monitored base station. The second base station 102(b) may be referred to herein as a neighboring base station.

The provider platform 106, as an example, may comprise components of a GSM communication network, including a core network and other components typical of such communication networks. The base stations 102 communicate with the provider platform 106 through a wide-area network (WAN) 108 such as the Internet, or through any other backhaul communications channel.

A monitoring device 110 is placed at each of the base stations 102. FIG. 1 shows two monitoring devices 110(a) and 110(b), placed at and associated with the first and second base stations 102(a) and 102(b), respectively. The following discussion will refer to the operation and characteristics of the monitoring device 110(a), with it being understood that other monitoring devices, associated respectively with different base stations, may also operate as described.

The monitoring device 110(a) is configured to obtain site data that is relevant to the operation of the monitored base station 102(a), and to report the site data to a support service 112 of the provider platform 106. The support service 112 may comprise any component, entity, or function that is associated with the cellular communications network or the cellular communications network provider.

In certain embodiments, the monitoring devices 110 may comprise programmable telecommunication handsets such as smartphones, which are configured by way of programming to perform the methods described below. For example, each of multiple monitoring smartphones may be configured to initiate an application at startup, where the application runs continuously to perform the actions that are described herein as being performed by the monitoring devices 110.

The monitoring devices 110 may be powered by mains power 114. More specifically, each of the monitoring devices 110 may be configured to operate from a direct-current power supply, which in turn is powered by the mains power 114.

In addition, each monitoring device 110 has a backup power supply 116, such as an internal battery, from which the monitoring device 110 receives power during outages of the mains power 114. This allows the monitoring devices 110 to detect and report anomalies, including power outages, even when there is no mains power.

In some cases, the monitoring device 110(a) may be placed within an enclosure of the monitored base station 102(a). In other cases, the monitoring device 110(a) may be placed in close proximity to the monitored base station 102(a) or to the cell site at which the monitored base station 102(a) is located. In yet other cases, the monitoring device 110(a) may be placed at any location that is within the radio coverage area of the monitored base station 102(a). In some cases, the monitoring device 110(a) may be located within a tamperproof enclosure to protect from theft or vandalism.

Although the monitoring devices are described as being a consumer-type mobile communications devices, the monitoring devices 110 may comprise any type of computing devices, such as a small single board computers and associated peripheral devices, that are able to detect or sense information relevant to the operation of the associated base stations 102.

The monitoring device 110(a) is configured to communicate with the support service 112 of the provider platform 106 using the wireless, cellular communication capabilities of the monitoring device 110(a) and the network 100. More specifically, the monitoring device 110(a) is capable of communicating through the different base stations 102 of the cellular communications network 100. The base stations of a cellular communications network often have overlapping coverage, so that the first monitoring device 110(a) may be able to utilize both of the first and second base stations 102(a) and 102(b) for communicating with the support service 112. In some situations, the monitoring device 110(a) may be within coverage areas of several base stations, all of which are considered to be neighboring base stations.

The monitoring device 110(a) is configured to obtain site data, which specifies anomalies, conditions, events, and/or signal characteristics of or at the associated base station 102(a), and to report the site data to the support service 112 of the provider platform 106. For example, the monitoring device 110(a) may be configured to detect an outage of the mains power 114 at the base station 102(a) and to report the outage to the support service 112. Anomalies may include, without limitation, faults and malfunctions, conditions or events that might cause faults or malfunctions, and/or conditions or events that might be symptomatic of faults or malfunctions.

The support service 112 may respond to site data in various ways. For example, the support service 112 may alert service personnel in response to site data indicating a problem at the monitored base station 102(a). As another example, the support service 112 may communicate with and dispatch appropriate service personnel in response to a detected anomaly at a monitored base station.

If possible, the monitoring device 110(a) communicates with the support service 112 through the monitored base station 102(a), which as described is the base station at which the monitoring device 110(a) is located. In certain situations, however, the monitored base station 102(a) may be inoperable, possibly due to an anomaly that is being reported by the monitoring device 110(a). In these situations, the monitoring device 110(a) communicates with the support service 112 through a neighboring base station, such as the neighboring base station 102(b). In cases where there are several available neighboring base stations, the monitoring device 110(a) may attach to and communicate through any of such neighboring base stations in order to communicate with the support service 112 and to report information regarding operation of the monitored base station 102(a). More generally, in some embodiments the monitoring device 110(a) may use any available means for communicating with the support service 112.

The monitoring device 110(a) may have or may have access to several types of sensors. For example, smartphones may have sensors allowing the detection of temperature, movement, vibration, orientation, humidity, barometric pressure, etc. In addition, a smartphone may have access to additional sensors that are accessed through wireless interfaces such as Bluetooth interfaces.

In some embodiments, the monitoring device 110(a) may be configured to determine whether an anomaly exists at the monitored base station 102(a), based on sensor data and/or other information. The site data may comprise an indication of a detected anomaly. Alternatively, the site data may include sensor data or other information that can be analyzed by the support service 112 to determine whether there is a failure or other anomaly at the monitored base station 102(a).

In addition to monitoring its sensors, the monitoring device 110(a) may be configured by way of programming to analyze data transmissions of the monitored base station 102(a). For example, a smartphone may use its cellular radio capabilities to determine signal information such as data rates or throughputs of the monitored base station 102(a), communication latencies, signal strengths, numbers of connections, and so forth. This may be done by observing and analyzing radio transmissions of the monitored base station 102(a) rather than by communicating with components of the monitored base station 102(a). In some cases, the monitoring device 110(a) may evaluate the signal information to detect anomalies, and the site data may specify these anomalies. In other cases, the site data may comprise the parameters or metrics derived from signal analysis, and the central support service 112 may evaluate the signal parameters or metrics to detect anomalies.

In some cases, the site data may indicate the cell ID to which the monitoring device 110(a) is attached, as an indication of whether the monitored base station 102(a) is functional and operating. For example, a smartphone may be configured to operate so that it communicates using the strongest or best available signal, which should in most cases be a signal from the monitored base station 102(a). The smartphone may be further configured to report the current cell ID as site data, or to notify the support service 112 when the current cell ID is not the cell ID of the monitored base station 102(a). This information may serve to indicate whether the smartphone has been able to attach to the monitored base station 102(a) and to establish a data connection through the monitored base station 102(a). An inability to establish a data connection through the monitored base station 102(a) may be interpreted as signifying that the monitored base station 102(a) is inoperative.

Figure 2:
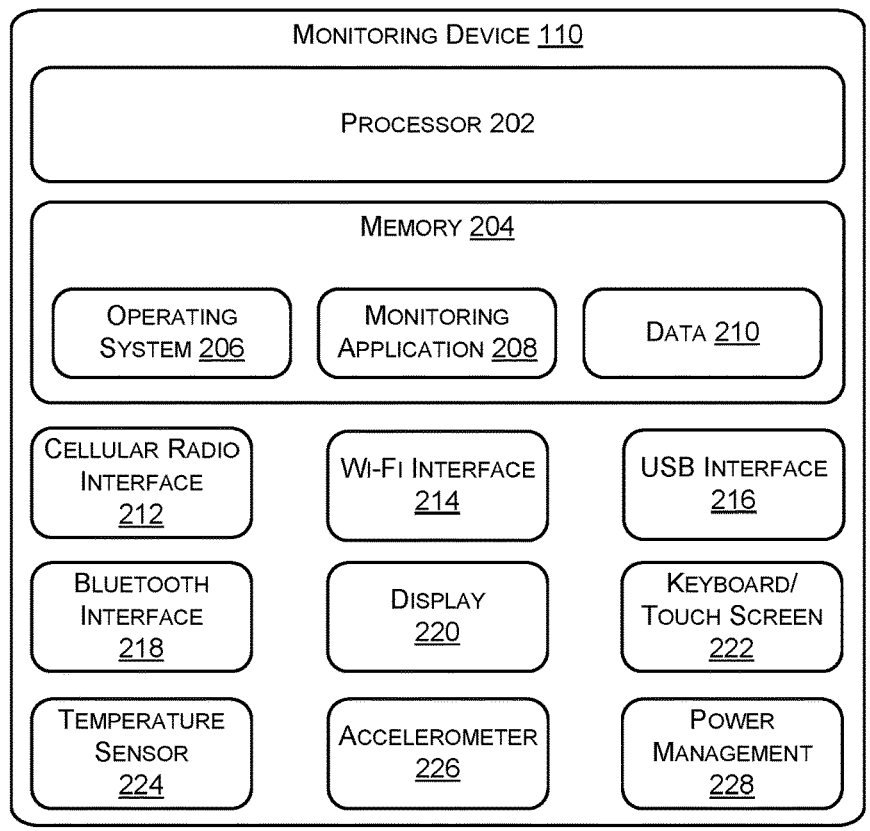
FIG. 2 is a block diagram of a programmable telecommunications device that may be used in certain implementations described herein.

FIG. 2 illustrates high level components and functionality of an example monitoring device 110, which as described above may in some cases comprise a mobile handset, smartphone, or other device having wireless telecommunication capabilities.

The device 110 has a processor 202 that is programmed by means of programs stored in memory 204. The processor(s) 202 may comprise one or more central processing units (CPUs) or processing cores, one or more graphics processing units (GPUs), and/or any other processors. The programs comprise computer-executable instructions that are executable by the processor(s) 202 that may be available for executing programs.

The programs may include an operating system 206 that supports basic functionality of the device 110, such as initiating applications, providing support for applications, managing power, network communications, interfacing with peripheral devices, etc. The programs stored in the memory 204 may also include one or more applications, which in this case include a monitoring application 208. The monitoring application 208 comprises computer-readable instructions that are executable by the processor 202 to perform the actions described herein as being performed by the monitoring device 110(a). Note that certain functions of the monitoring application 208 may be supported by elements of the operating system 206 and/or other software components residing on the monitoring device 110.

The memory 204 may also be used to store various types of data 210. The data 210 may be created and/or used by components of the operating system 206 as well as by programs such as the monitoring application 208.

In various embodiments, the memory 204 may comprise one or more machine-readable media, which may in turn include volatile and/or non-volatile memory. The memory 204 can also be described as non-transitory computer-readable media and may include removable and non-removable media implemented in any method or technology for storage of information, such as computer-executable instructions, data structures, program modules, or other data.

Non-transitory computer-storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium that can be used to store the desired information and that can be accessed by the device 110, including network-accessible storage.

The monitoring device 110 may include various types of communication interfaces, which in this example include a wireless cellular network interface 212. The wireless cellular network interface 212 may include radio transceivers that perform the function of transmitting and receiving radio frequency communications via an antenna. The cellular network interface 212 facilitates wireless connectivity between the device 110 and various base stations 102 of the cellular communications network. The cellular network interface 212 may also be used to monitor data transmissions of base stations to obtain performance parameters such as data transfer speed, communication latencies, signal strength, and so forth.

The monitoring device 110 may in some cases also have a Wi-Fi interface 214, which may be used to communicate through a Wi-Fi network when such a network is available.

The monitoring device 110 may have additional interfaces, such as a USB interface 216 and a Bluetooth interface 218, which may be used for communications with peripherals and other devices such as environmental sensors. In some implementations, the device 110 may have or may be connected to an Ethernet interface (not shown), which may be used to communicate with the provider platform 106 through the wide-area network 108.

The monitoring device 110 in the described example implements a user interface through a display 220 and a keyboard or touch screen 222. In various embodiments, the display 220 may comprise a liquid crystal display or any other type of display commonly used in telecommunication devices or other portable devices. For example, the display 220 may be a touch-sensitive display screen, which may also act as an input device or keypad, such as for providing a soft-key keyboard, navigation buttons, or the like.

The monitoring device 110 may have various types of sensors. For example, FIG. 2 shows the monitoring device 110 having a temperature sensor 224 and an accelerometer 226. The temperature sensor 224 may be used to detect excessive temperatures at an associated base station. The accelerometer 226 may be used to detect vibrations, including seismic events, at the associated base station 102. The monitoring device 110 may have additional sensors that are not shown, or may have access to additional sensors by way of the USB interface 216 and/or the Bluetooth interface 218. Additional sensors might include infrared sensors, optical sensors, oxygen sensors, air quality sensors, etc.

The monitoring device 110 may also have a power management component 228. The power management component 228 controls battery charging and can be queried to determine whether the monitoring device 110 is receiving external power. The absence of external power may be taken as an indication of a power outage at the site of the monitoring device 110.

The monitoring device 110 may include various other physical and functional components that are not shown in FIG. 2.

Figure 3:
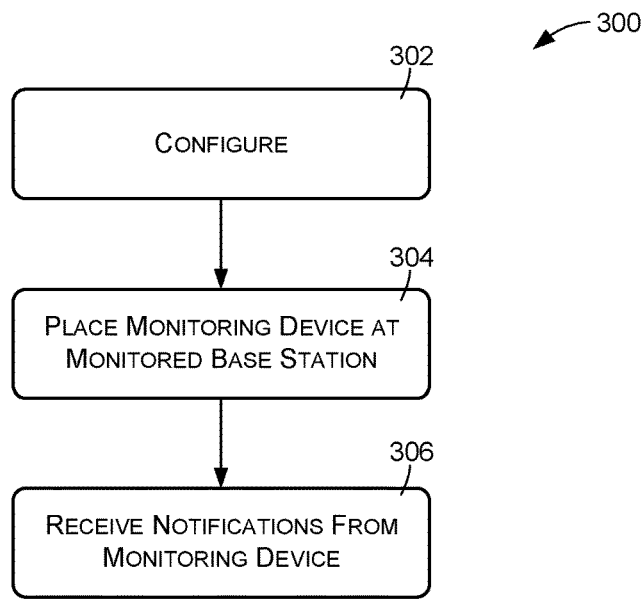
FIG. 3 is a flow diagram showing an example method of using multiple monitoring devices to monitor respectively corresponding base stations.

FIG. 3 illustrates an example method 300 that may be performed by a wireless service provider, or by personnel of the wireless service provider, in order to monitor multiple base stations. The method 300 may be performed multiple times, for multiple base stations of a cellular communications network, so that a monitoring device 110 is configured for and placed at each of the base stations.

An action 302 comprises configuring a monitoring device 110. The action 302 may comprise provisioning a smartphone or other programmable communications handset to operate as part of the cellular communications network 100. The action 302 may also include specifying one or more cell IDs of the base station 102 that the monitoring device 110 is intended to monitor. As an example, the monitoring device 110 may be configured by way of an application to automatically detect multiple signals, from one or more of the base stations 102, and to display the cell IDs used by the corresponding base stations 102. A technician may select one or more of the cell IDs, corresponding to base stations that should be monitored by the monitoring device 110. The monitoring device 110 remembers the selection, and uses the selected cell ID to identify the selected base station 102 when reporting information about the base station 102.

An action 304 comprises placing the monitoring device 110 at a monitored base station 102. The monitoring device 110 may be placed within an enclosure of the monitored base station 102 or in a separate enclosure near the enclosure of the monitored base station 102. In some cases, the monitoring device 110(a) may be placed within a tamperproof enclosure to prevent theft and vandalism.

An action 306 comprises receiving site data from the monitoring device 110. For example, the monitoring device 110 might send site data to the support service 112 regarding conditions, status, events, and/or anomalies at the monitored base station 102.

The method 300 is performed for multiple base stations 102 and corresponding monitoring devices 110. Accordingly, the support service 112 will typically receive site data from multiple base stations 102. In response to receiving site data indicating a fault or other anomaly at base a station 102, the support service 112 may raise an alarm in a monitoring center and/or may send notifications to technical personnel who are responsible for the operation of the anomalous base station. In some cases, the base station anomaly might be diagnosed based on site data, allowing the dispatch of the correct type of service personnel to the base station.

Figure 4:
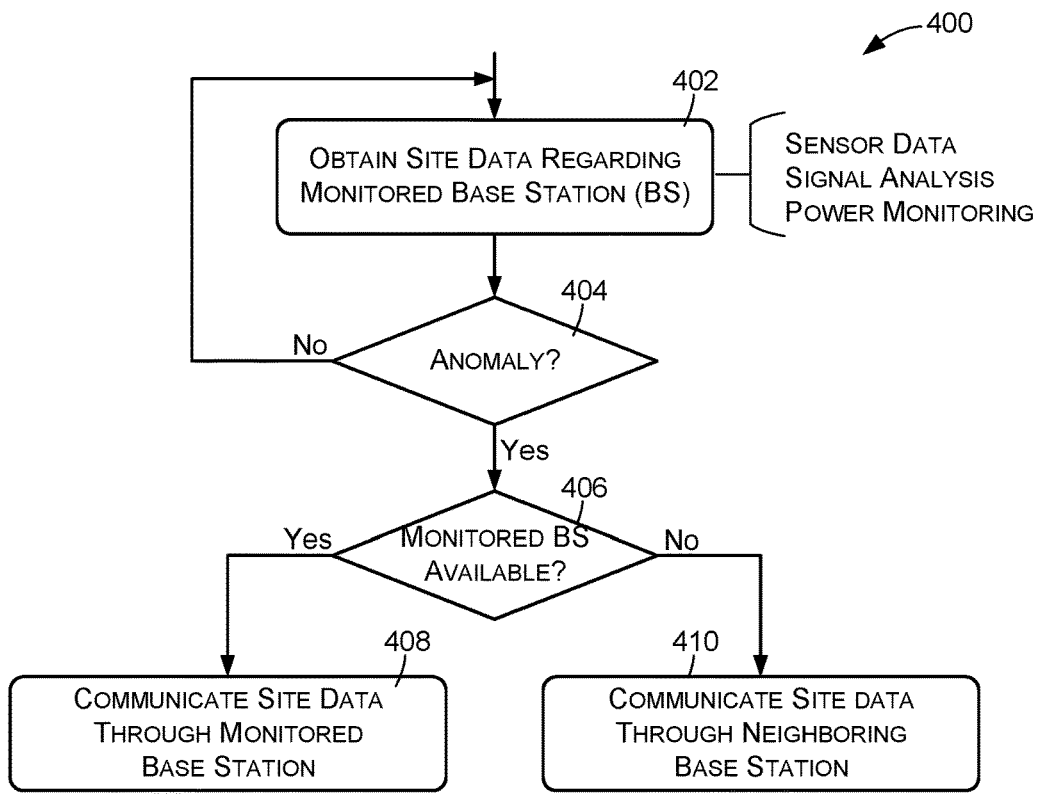
FIG. 4 is a flow diagram showing an example method of reporting base station anomalies to a support service of a cellular communications network.

FIG. 4 illustrates an example method 400 showing how a monitoring device 110 may communicate site data to the provider platform 106. The example method 400 will be described as being performed with respect to the first base station 102(a) by the corresponding monitoring device 110(a). However, the method 400 may be performed independently by multiple monitoring devices 110, with respect to respectively corresponding base stations 102.

An action 402 comprises obtaining site data regarding operation of the monitored base station (BS) 102(a). Generally, site data may indicate sensor data, calculated parameters and metrics, detected anomalies, and/or any other relevant information available to the monitoring device 110(a). For example, site data may indicate ambient or internal temperature, power supply voltage and current, water or moisture detection, vibration, humidity, signal strength, power supply voltage, component temperatures, etc. Site data may also, or alternatively, indicate and identify a specific environmental condition that has the potential for impairing the monitored base station 102(a), such as a high temperature, the presence of water, or a power outage. Site data may in some cases include the cell ID of the base station to which the monitoring device 110(a) is attached.

Site data may in some cases include parameters or metrics that are determined based on the analysis of radio transmissions by the monitored base station 102(a). For example, the action 402 may comprise receiving, using the wireless cellular network interface 212 of the monitoring device 110(a), one or more wireless data signals that have been transmitted by the monitored base station 102(a) for communicating with mobile devices other than the monitoring device 110(a), and analyzing the wireless data signals to determine performance parameters such as data rates, bandwidths, loading, throughput, latencies, etc. In some cases, these metrics and parameters may be obtained solely by observation, without communications between the monitoring device 110(a) and the monitored base station 102(a). Cellular radio components of the monitoring device 110(a) may be used for receiving and analyzing wireless data signals from the monitored base station 102(a).

As a further example, the action 402 may include analyzing wireless data signals transmitted by the monitored base station 102(a), to detect the cessation of cellular data transmissions by the monitored base station 102(a). The site data may then include an indication that the monitored base station 102(a) has ceased transmissions of cellular data signals.

The action 402 may include receiving information from power monitoring/management components of the monitoring device 110(a) to detect times during which the monitoring device 110(a) is not receiving external power, which may indicate a power outage at the monitored base station 102(*a*). The action 402 may comprise determining that there is an outage of the mains power 114 at the monitored base station, and the site data may indicate the outage. As described above, the monitoring device 110(*a*) may continue to operate during power outages by receiving power from its battery 116.

An action 404 comprises detecting an anomaly at the monitored base station 102(*a*). The action 404 may be based on any of the site data described above.

As an example, the action 404 may comprise comparing performance metrics to corresponding thresholds in order to detect anomalies. An anomaly in this example might be considered to be any performance metric that is outside of a desired or specified threshold or range. In some cases, the action 404 may be performed without communication between the monitoring device 110(*a*) and the monitored base station 102(*a*), by analyzing wireless data signals transmitted by the monitored base station 102(*a*). Wireless data signals may be analyzed to detect performance metrics such as data transmission rates, data throughput, communication latencies, signal strengths, radio access technologies, frequency bands, etc.

As another example, the action 404 may comprise detecting an inability of the monitoring device 110(*a*) to connect to the cellular communications network 100 through the monitored base station 102(*a*). More specifically, the action 404 may comprise detecting an inability of the monitoring device 110(*a*) to connect or attach to the monitored base station 102(*a*) or detecting that the monitoring device 110(*a*) has attached to a base station other than the monitored base station, such as will be described below with reference to FIG. 5. As yet another example, the action 404 may include detecting the cessation of data transmissions by the monitored base station 102(*a*).

As further examples, the action 404 may include detecting power outages, detecting over-temperature situations, detecting seismic events, detecting moisture or water, etc.

If an anomaly is not detected in the action 404, the action 402 is repeated.

In some cases, the action 404 may be omitted, and site data may be sent to the provider platform 106 regardless of whether the site data indicates an anomaly or whether an anomaly has been detected. In these cases, the site data sent to the provider platform 106 might include metrics and parameters that may or may not indicate an anomaly, and the support service 112 analyzes the metrics and parameters to identify anomalies. In some cases, the monitoring device 110(*a*) may send site data to the support service 112 whether or not there is a detected anomaly, but may also indicate any detected anomalies.

An action 406, which in the described embodiment is performed in response to detecting an anomaly, comprises determining whether the monitored base station 102(*a*) is available for communications with the support service 112. In response to determining that the monitored base station 102(*a*) is operational and available for use by the monitoring device 110(*a*), and that an anomaly has been detected, an action 408 is performed of communicating wirelessly with the support service 112, through the monitored base station 102(*a*), in order to notify the support service 112 of the site data. That is, the monitoring device 110(*a*) establishes a cellular data connection through the monitored base station 102(*a*) and transmits the site data to the monitored base station 102(*a*), from where it is eventually communicated to the support service 112.

In response to determining that the monitored base station 102(*a*) is not operational or not available for attachment, and/or that an anomaly has been detected, an action 410 is performed of communicating, using a wireless cellular network interface of the monitoring device 110(*a*), with the support service 112 through a base station other than the monitored base station 102(*a*), such as through the neighboring base station 102(*b*). That is, the monitoring device 110(*a*) establishes a cellular data connection through the neighboring base station 102(*b*) and transmits the site data to the neighboring base station 102(*b*), from where it is eventually communicated to the support service 112.

The action 410 may include notifying the support service of the site data and/or detected anomaly. The neighboring base station 102(*b*) may be a base station associated with the provider platform 106, or may be a base station associated with another provider platform.

Using the method 400, communications may be maintained between the monitoring device 110(*a*) and the provider platform 106 even when the monitored base station is inoperative. Note that in some implementations, the monitoring device 110(*a*) may be configured to communicate through the neighboring station 102(*b*) by default, rather than trying first to communicate through the monitored base station 102(*a*). Also note that when the monitoring device 110(*a*) is a smartphone, selection of base stations in this manner typically happens automatically under the control of the operating software of the smartphone.

Figure 5:
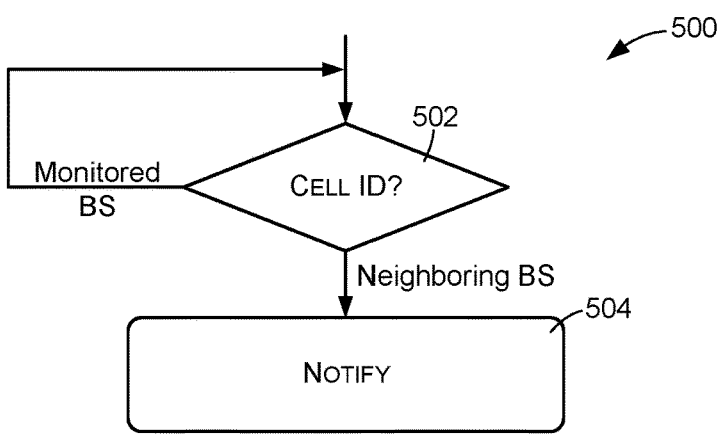
FIG. 5 is a flow diagram showing an example method of detecting an anomaly at a base station of a cellular communications network.

FIG. 5 illustrates another example method 500 that may be implemented by the monitoring device 110(*a*) to report base station status to the support service 112. In this example, the monitoring device 110(*a*) comprises a telecommunications handset, such as a smartphone, which is configured in such a way that it can indicate either the ability or the inability of the handset to attach to the cellular communications network through the monitored base station 102(*a*). More specifically, the handset is configured to operate so that it uses the strongest or best available base station signal for communications with the provider platform 106. The handset is further configured to perform an action 502 of determining whether the cell ID of the base station to which the monitoring device 110(*a*) is attached corresponds to the monitored base station 102(*a*). If it does, the monitored base station is assumed to be functioning, and the action 502 is repeated periodically. If the cell ID in use by the monitoring device 110(*a*) does not match the cell ID of the monitored base station 102(*a*), and/or instead corresponds to the neighboring base station 102(*b*), an action 504 is performed of notifying the support service 112. The action 504 may be performed as described above with reference to the actions 406, 408, and 410 of FIG. 4.

Note that in the method 400 of FIG. 4, the site data may in some cases comprise the cell ID that is in use by the monitoring device 110(*a*), and/or whether the cell ID in use by the monitoring device 110(*a*) matches the cell ID of the monitored base station 102(*a*).

Figure 6:
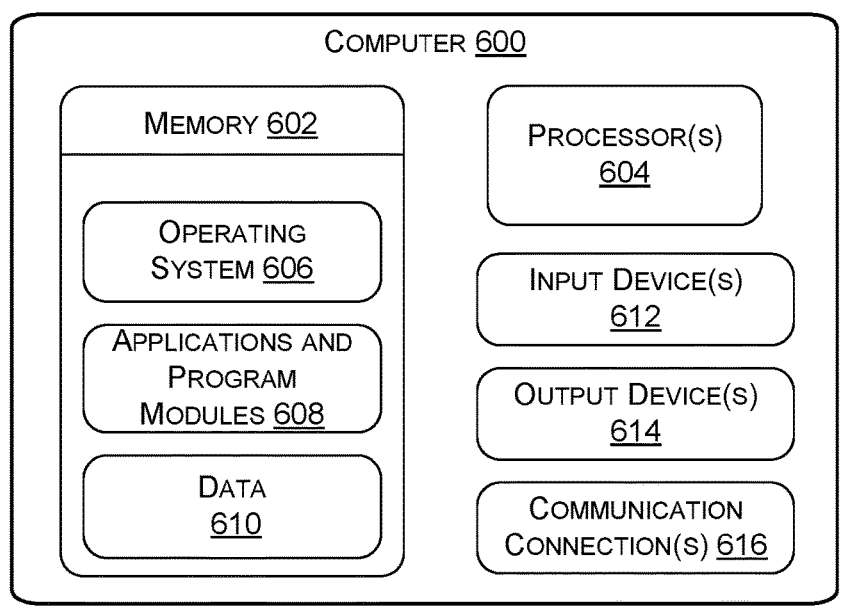
FIG. 6 is a block diagram of a computing device that may be used to implement functional components of a telecommunications provider platform, including a support service of the telecommunications platform.

FIG. 6 is a block diagram of an illustrative computer 600, which may be configured as a computer server to implement various components associated with the provider platform, such as the support service 112.

The computer 600 may include memory 602 and a processor(s) 604. The memory 602 may include both volatile memory and non-volatile memory. The memory 602 can also be described as non-transitory computer-readable storage media or machine-readable memory, and may include removable and non-removable media implemented in any method or technology for storage of information, such as computer executable instructions, data structures, program modules, or other data.

The memory 602 may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information. The memory 602 may in some cases include storage media used to transfer or distribute instructions, applications, and/or data. In some cases, the memory 602 may include data storage that is accessed remotely, such as network-attached storage that the computer 600 accesses over some type of data communications network.

The memory 602 stores one or more sets of instructions (e.g., software) such as a computer-executable program that embodies operating logic for implementing and/or performing any one or more of the methodologies or functions described herein. The instructions may also reside at least partially within the processor 804 during execution thereof by the computer 600.

Generally, the instructions stored in the memory 602 may include an operating system 606, various applications and program modules 608, and various types of data 610.

In some embodiments, the processor(s) 604 is a central processing unit (CPU), a graphics processing unit (GPU), both CPU and GPU, or other processing unit or component known in the art. Furthermore, the processor(s) 604 may include any number of processors and/or processing cores, and may include virtual processors, computers, or cores. The processor(s) 604 is configured to retrieve and execute instructions from the memory 602.

The computer 600 may also have input device(s) 612 such as a keyboard, a mouse, a touch-sensitive display, voice input device, etc. Output device(s) 614 such as a display, speakers, a printer, etc. may also be included. The computer 600 may also contain communication connections 616 that allow the device to communicate with other computing devices. For example, the communication connections 616 may include a network communication interface such as an Ethernet adapter, which is typically used to communicate using IP-based communication protocols with other computers 600 that implement various functionality associated with the provider platform. The communication connections may also include other types of interfaces or adapters, such as Wi-Fi interfaces.

Although features and/or methodological acts are described above, it is to be understood that the appended claims are not necessarily limited to those features or acts. Rather, the features and acts described above are disclosed as example forms of implementing the claims.

What is claimed is:

1. A telecommunications handset for placement at a first base station of a cellular communications network, the telecommunications handset comprising:
    a wireless cellular network interface;
    one or more processors;
    non-transitory computer-readable media storing computer-executable instructions that, when executed by the one or more processors, cause the one or more processors to perform actions comprising:
        detecting an anomaly at the first base station; and
        in response to detecting the anomaly at the first base station, reporting, to a support service associated with the cellular communications network, the anomaly by communicating with the support service through a second base station that is different than the first base station,
    wherein detecting the anomaly comprises determining the telecommunications handset has attached to a base station other than the first base station.

2. The telecommunications handset of claim 1, wherein detecting the anomaly comprises determining an inability of the telecommunications handset to connect to the cellular communications network through the first base station.

3. The telecommunications handset of claim 1, wherein the wireless data signal has been transmitted by the first base station for communicating with a mobile device other than the telecommunications handset.

4. The telecommunications handset of claim 1, wherein detecting the anomaly is performed without communication between the telecommunications handset and the first base station.

5. The telecommunications handset of claim 1, wherein detecting the anomaly comprises:
    analyzing the wireless data signal to determine a performance metric, wherein the performance metric comprises one or more of:
        a data transmission rate;
        a data throughput;
        a communication latency; or
        a signal strength;
        a radio access technology;
        a frequency band; and
    determining that the performance metric is outside a desired range of the performance metric.

6. The telecommunications handset of claim 1, wherein the anomaly comprises a cessation of data signal transmissions by the first base station.

7. A system, comprising:
    a monitoring device for placement at a first base station of a cellular communication network, the monitoring device having one or more processors,
    the monitoring device having non-transitory computer-readable media storing computer-executable instructions that, when executed by the one or more processors, cause the one or more processors to perform actions comprising:
        obtaining site data regarding the first base station; and
        reporting, to a support service of the cellular communications network through a second base station of the cellular communications network, the site data regarding the first base station by communicating wirelessly with the second base station,
    wherein obtaining the site data regarding the first base station comprises determining the monitoring device has attached to a base station other than the first base station.

8. The system of claim 7, further comprising multiple monitoring devices placed respectively at multiple base stations.

9. The system of claim 7, wherein the site data indicates an inability of the monitoring device to communicate through the first base station.

10. The system of claim 7, wherein the monitoring device comprises a programmable telecommunications handset.

11. The system of claim 7, wherein obtaining the site data comprises:
    receiving a wireless data signal that has been transmitted by the first base station; and
    analyzing the wireless data signal.

12. The system of claim 7, wherein:
obtaining the site data comprises detecting an environmental condition that has a potential for impairing the first base station; and
the site data indicates the environmental condition.

13. The system of claim 7, wherein the monitoring device comprises a programmable telecommunications device, the programmable telecommunications device having a battery, the actions further comprising:
determining that there is an outage of mains power at the first base station;
receiving power from the battery during the outage of the mains power; and
wherein the site data regarding the first base station indicates, to the support service, the outage of the mains power.

14. The system of claim 7 wherein obtaining the site data regarding the first base station further comprises determining a cell ID of the base station other than the first base station is different than a cell ID of the first base station.

15. A method for monitoring base stations of a cellular communications network, the method comprising:
configuring a monitoring device of multiple monitoring devices to perform actions comprising:
obtaining site data indicative of an anomaly at an associated base station; and
sending, to a support service of the cellular communications network, the site data through a neighboring base station by communicating wirelessly through the neighboring base station, the neighboring base station being different than the associated base station,
wherein obtaining the site data indicative of the anomaly at the associated base station comprises determining the monitoring device has attached to a base station other than the associated base station.

16. The method of claim 15, wherein the site data indicates that the associated base station has ceased transmitting data signals.

17. The method of claim 15, wherein the monitoring devices comprise programmable telecommunications handsets.

18. The method of claim 15, wherein obtaining the site data comprises:
receiving a wireless data signal that has been transmitted by the associated base station; and
analyzing the wireless data signal to determine a performance metric, wherein the site data includes the performance metric.

19. The method of claim 15, wherein the anomaly comprises an environmental condition that has a potential for impairing the associated base station, the environmental condition comprising at least one of an ambient temperature, an internal temperature, a moisture level, a vibration, or a humidity level.

20. The method of claim 15 wherein obtaining the site data indicative of the anomaly at the associated base station further comprises determining a cell ID of the base station other than the associated base station is different than a cell ID of the associated base station.

* * * * *